July 1, 1958 B. C. THOMSON ET AL 2,840,973
PICK-UP ATTACHMENT FOR CANE HARVESTERS
Filed Aug. 22, 1956 7 Sheets-Sheet 3

INVENTORS
B.C. THOMSON
P. F. OSWALD
BY
Wilkinson, Mawhinney & Theibault
ATTORNEYS

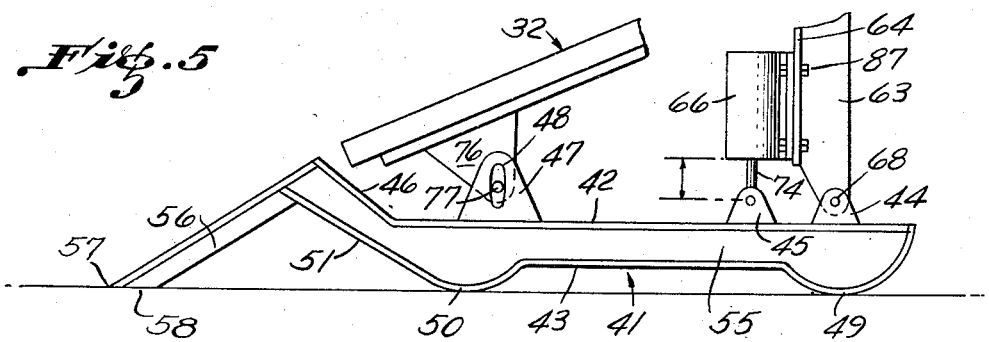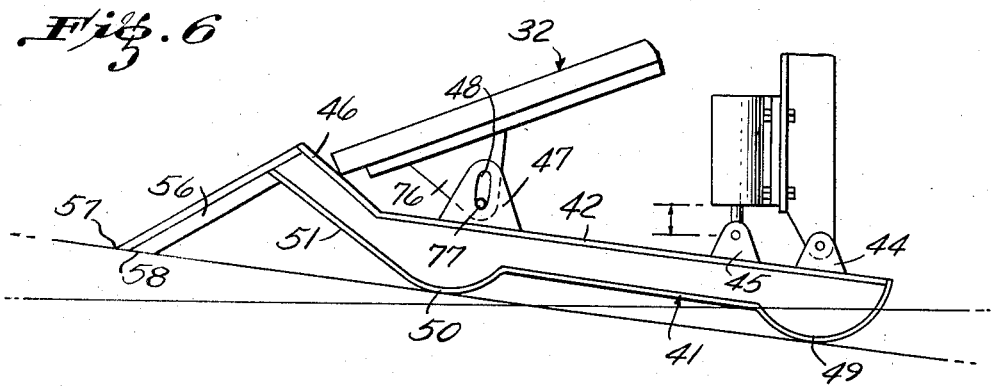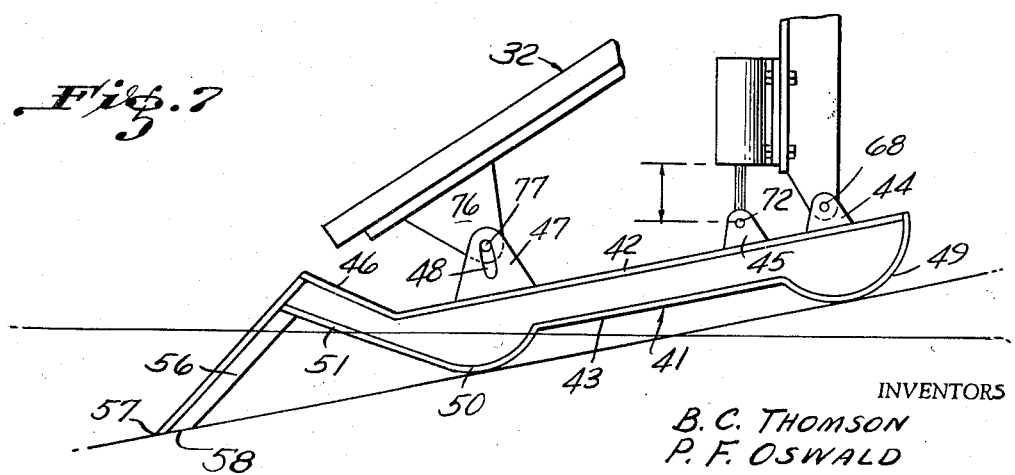

July 1, 1958
B. C. THOMSON ET AL
2,840,973
PICK-UP ATTACHMENT FOR CANE HARVESTERS
Filed Aug. 22, 1956
7 Sheets-Sheet 5
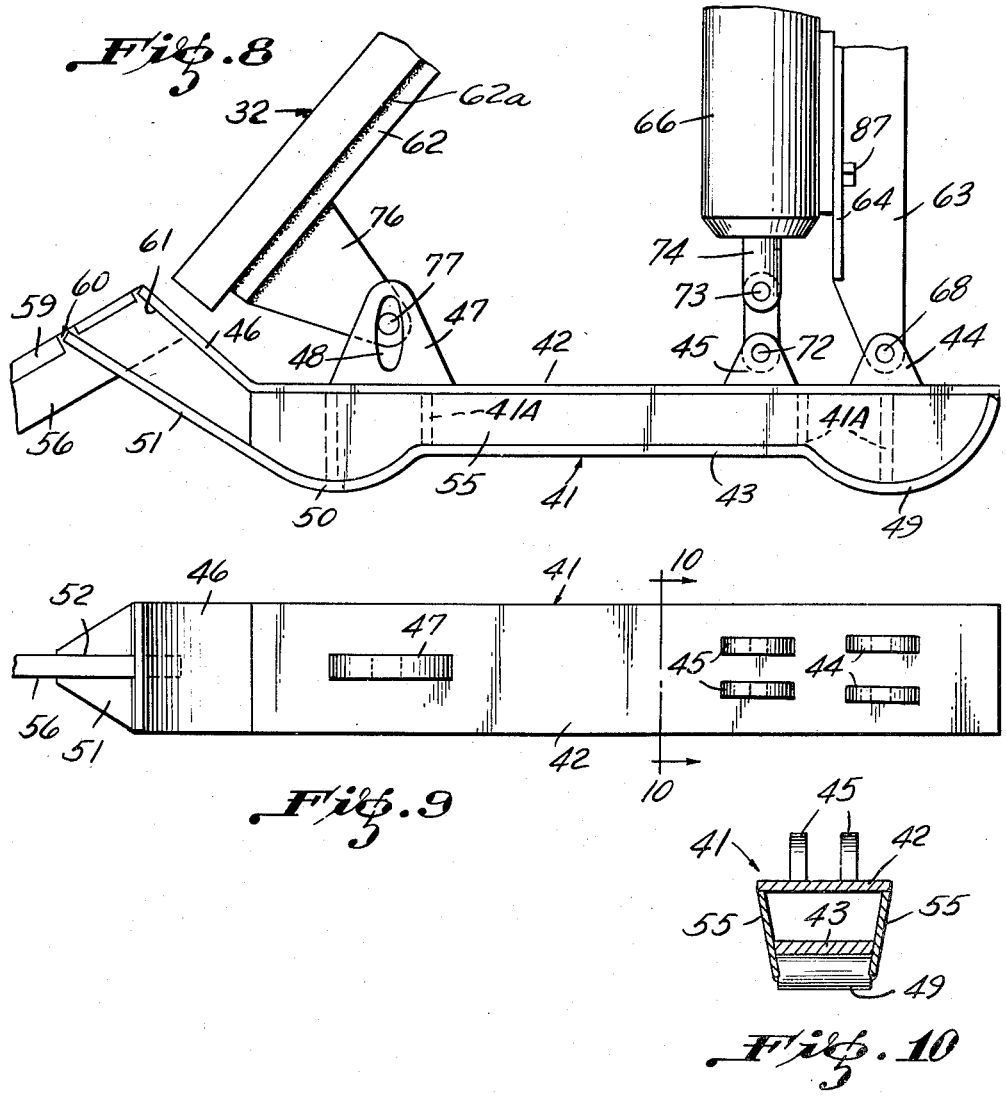
INVENTORS
B. C. THOMSON
P. F. OSWALD

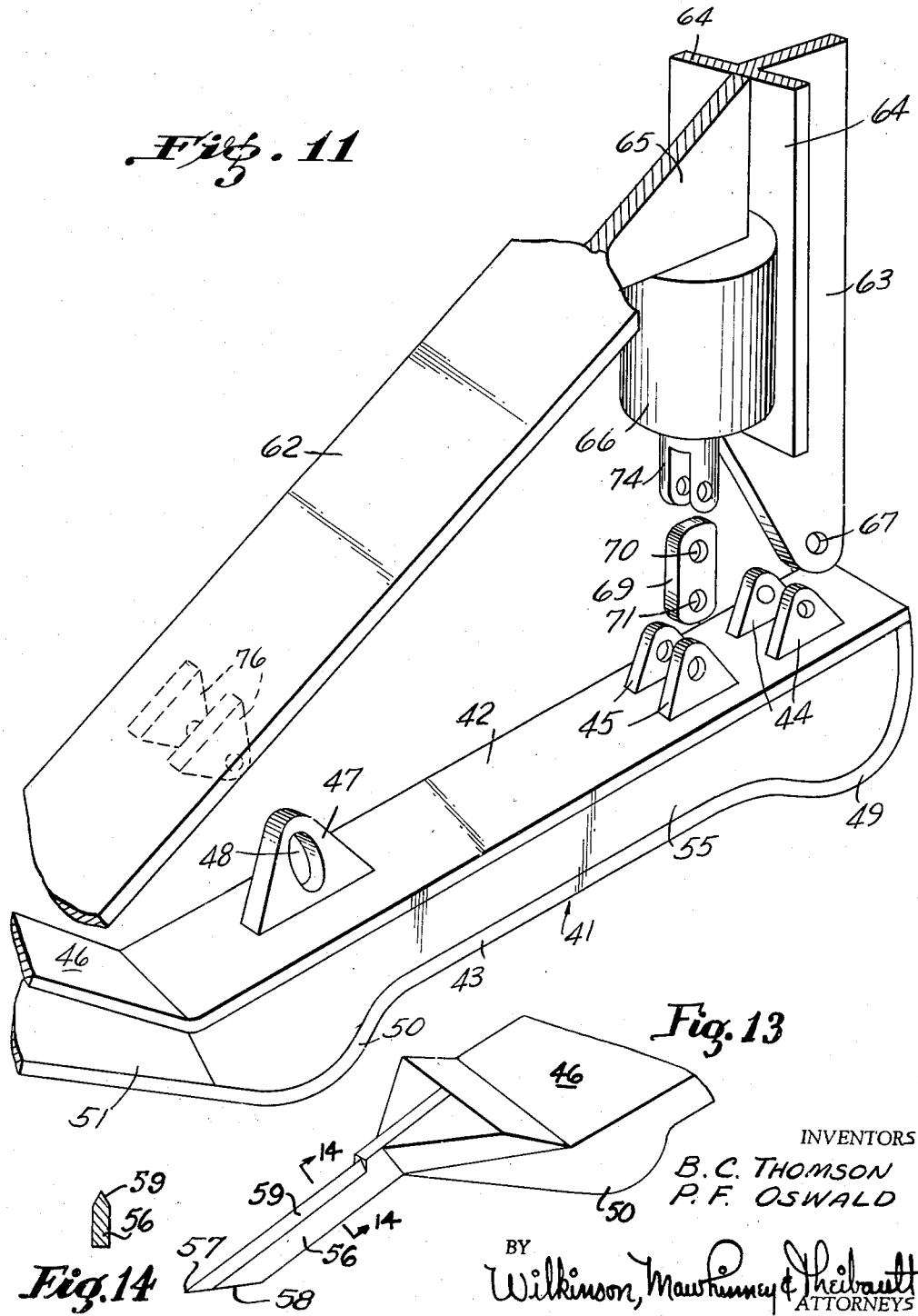

July 1, 1958
B. C. THOMSON ET AL
2,840,973
PICK-UP ATTACHMENT FOR CANE HARVESTERS
Filed Aug. 22, 1956
7 Sheets-Sheet 7
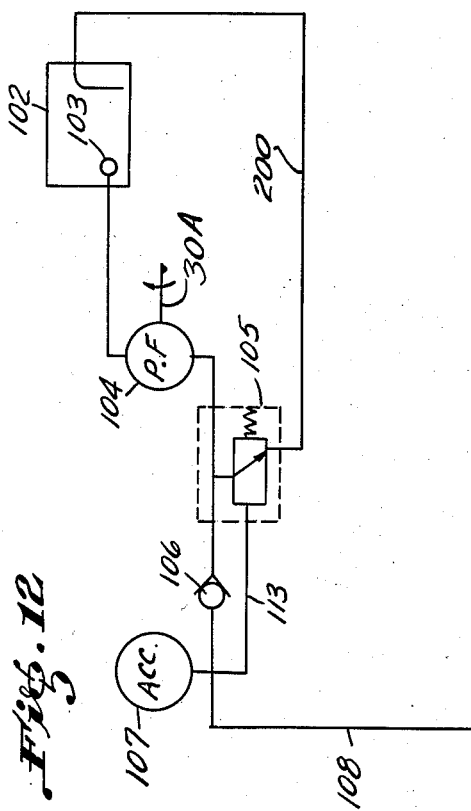
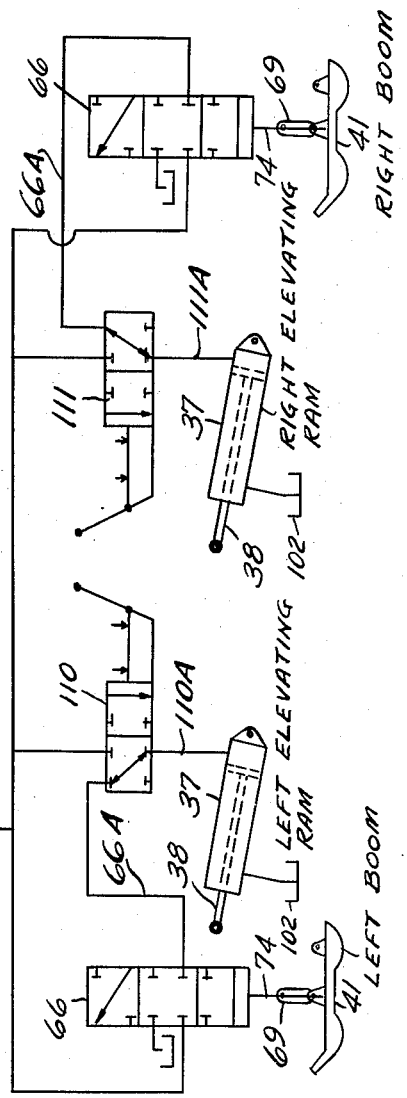
INVENTORS
B. C. THOMSON
P. F. OSWALD
BY
Wilkinson, Mawhinney & Theibault
ATTORNEYS United States Patent Office 2,840,973
Patented July 1, 1958

2,840,973

PICK-UP ATTACHMENT FOR CANE HARVESTERS

Byron C. Thomson, Thibodaux, and Paul F. Oswald, New Orleans, La., assignors, by direct and mesne assignments, to Thomson Machinery Company, Thibodaux, La., a corporation of Louisiana Application August 22, 1956, Serial No. 605,543

15 Claims. (Cl. 56—15)

The present invention relates to pick-up attachment for cane harvesters and has for an object to provide a pick-up device which will follow ground contours in order to pick up recumbent cane so that it will enter the harvester instead of being run over by the harvester wheels.

The major problem for a sugar can harvester in the tropics where cane grows for eighteen months before milling is the excessive amount of down cane which proves difficult to pick up and erect so that it will be received in a standing position by the harvester. This down cane rests very close to the ground which requires the pick-up attachment, or its pilot device, to move very close to the ground to enter beneath the cane and consequently this device will have to ride upon the uneven terrain. This device, being for instance in the form of a ground skid or shoe, senses the irregularities in the surface of the ground and by mechanical linkage, or otherwise, communicates the same to a hydraulic, or other, mechanism which acts substantially instantaneously and automatically to raise or lower the attachment in response to the signalling action of the pilot device.

It is therefore a further object of the invention to provide an automatic control device for the attachment which will instantaneously lift and lower the same and in which simplicity of construction and operation are factors of novel importance.

The invention has for its further purpose and object to provide an improved form of ground skid or shoe which is carried in a novel manner movably at the lower end of the movable attachment, which latter is preferably carried by an auxiliary frame on the harvester, the skid or shoe being so complementally formed in relation to the lower end of the attachment that it forms in effect a downward prolongation of the same so that there is continuity of transition of the cane from the skid to the attachment in the act of lifting and erecting the cane from its recumbent position.

A still further object of the invention is to provide related structures of skid and pilot blade which occupies a position in which it will probe in advance the ground contour with its lower end reaching very close to the surface for initially engaging beneath the recumbent cane, and with its sharp slanting upper edge for cutting through soft earth and cane ratoons.

A still further object of the invention is to provide a relationship of structure between the lower end of the boom attachment and the ground skid to provide conjoint stop means for limiting the movement of the skid in relation to the stroke of the spool in the skid operated hydraulic valve.

With the foregoing and other objects in view, the invention will be more fully described hereinafter, and will be more particularly pointed out in the claims appended hereto.

In the drawings, wherein like symbols refer to like or corresponding parts throughout the several views:

Figure 4 is a cross section taken through line 4—4 in Figure 2 and shows how the pick-up chains convey the cane up the booms and then disappear to return unobstructed.

Figure 5 is a side elevational view taken on an enlarged scale of the lower end of the boom, showing a form of connection thereto of the skid or ground shoe and also the connection to the skid operated hydraulic valve with the skid illustrated in an intermediate position as travelling over substantially level ground.

Figure 6 is a similar view showing the skid in its uppermost tilted position in the act of ascending a grade on the ground surface.

Figure 7 is a similar view showing the skid in its lowermost tilted position as moving down a declivity.

Figure 8 is a fragmentary side elevational view of the lower end of a boom, skid, and connection to the skid operated hydraulic valve taken on a greatly enlarged scale with the skid in the intermediate position.

Figure 9 is a top plan view taken on an enlarged scale of the skid as detached from the boom and skid operated hydraulic valve.

Figure 10 is a cross sectional view taken through the skid on line 10—10 in Figure 9.

Figure 11 is a fragmentary isometric view taken on an enlarged scale, with parts shown in section, showing a preferred form of skid and method of connection to the lower part of boom and to the hydraulic valve.

Figure 12 is a schematic diagram of a convenient and preferred form of hydraulic system that may be used.

Figure 13 is a fragmentary perspective view taken on an enlarged scale of a modified form of pilot blade attaching means.

Figure 14 is a transverse section taken on lines 14—14 in Figure 13.

Figure 1:
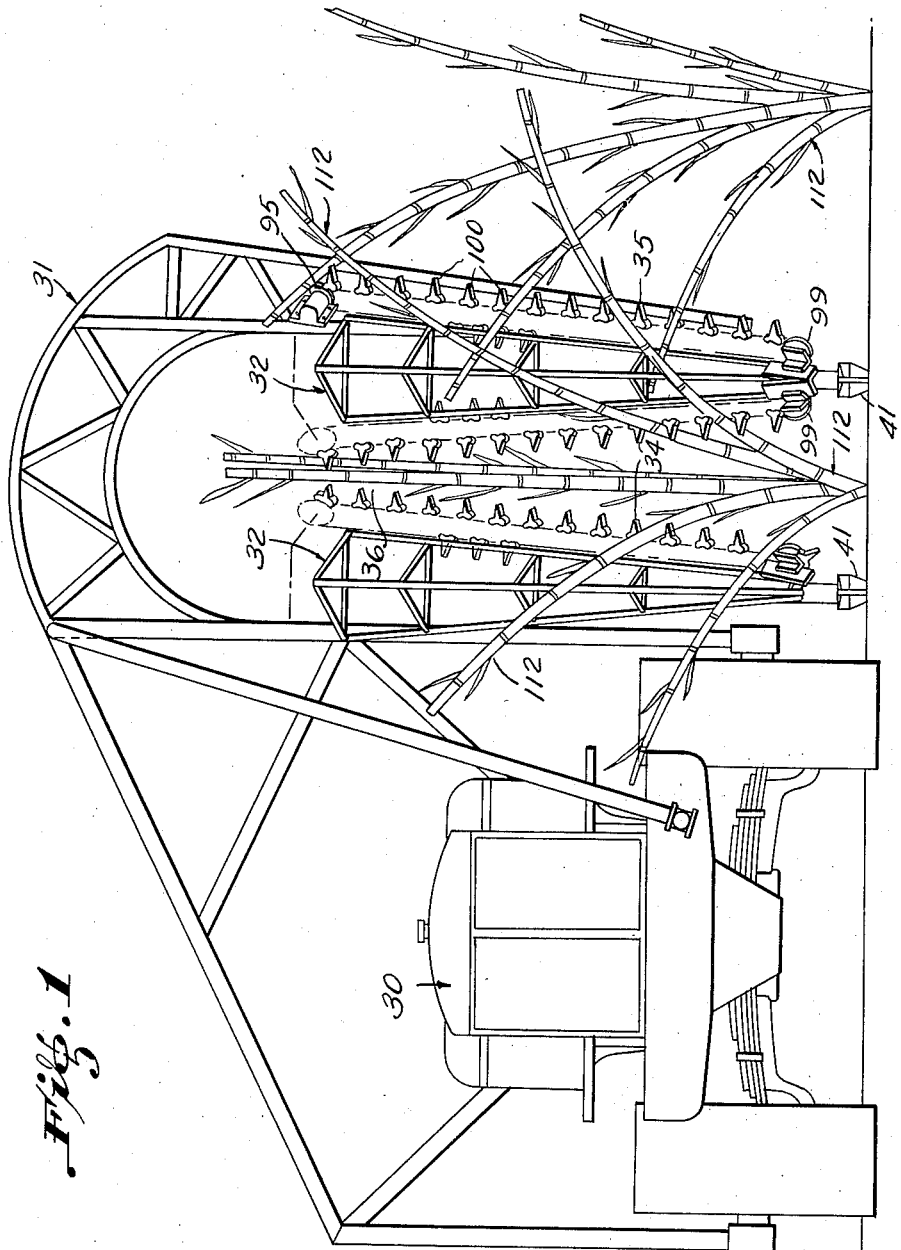
Figure 1 is a front elevational view of a tractor having an auxiliary frame carrying pick-up attachments (also called booms) for cane harvesters constructed in accordance with the present invention.
Figure 2:
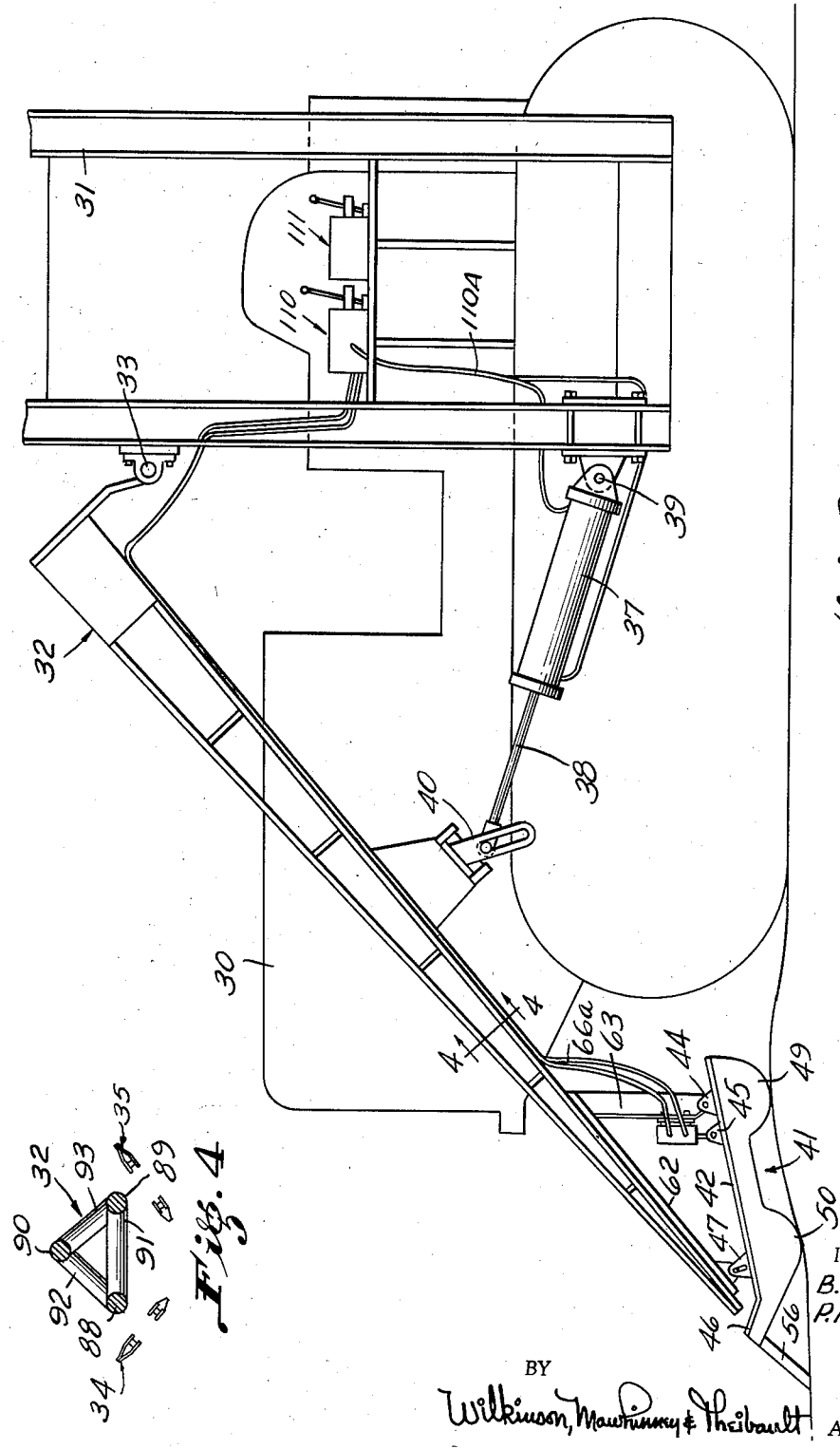
Figure 2 is a side elevational view of the same taken on an enlarged scale.

Refering more particularly to the drawings, Figures 1 and 2 illustrate a tractor 30 of the crawler or endless track type, preferably having an auxiliary frame 31 built thereon and extending from one side thereof in arch formation to receive the standing cane therethrough as the vehicle proceeds through the cane field.

The frame 31 carries a pair of pick-up attachments or booms 32, suitably spaced, each hinged or pivoted at 33 high up on the forward portion of the frame 31 and declining downwardly and forwardly. The booms 32 are pivoted at 33 for independent and individual swinging movement in substantially parallel vertical planes and each boom carries an endless chain 34 angularly mounted so as the one length of the chain carries the recumbent cane upward and rearwardly while the returning length of chain is hidden beneath the boom. The boom that is next to the standing row of cane also has an endless chain 35 that will pick up and deflect the recumbent standing cane so the harvester will pass and not run over the cane; this action is similar to the pick-up and gathering chains 34.

The booms 32 are tapered from wide rear ends at the pivots 33 down to forward lower narrower ends near the ground line. Due to this tapering construction in the relation stated the booms 32 together form an upwardly convergent throat 36 therebetween through which the cane may be erected and passed to the harvester as the vehicle moves the pick-up device forward. This convergent throat 36 is illustrated to best advantage in Figure 1, in which it will also be seen that the adjacent runs of the angularly inclined endless gathering chains 34 move upwardly and mutually toward one another to follow the general pattern of this convergent throat 36. Also it will be seen that the angularly inclined endless chain 35 will deflect the adjacent row of cane. The angular arrangement of the endless chains 34 and 35 are illustrated in Figure 4.

The booms 32 are adapted to be moved up and down about their pivot points 33 independently by a suitable motivating means or power operated means, as illustrated in Figures 2 and 12 hydraulic cylinders 37 having plunger rods 38, the cylinders 37 being pivoted, as at 39 to the auxiliary frame 31 while the plunger rods 38 are connected by attachment knuckle 40 to the respective boom 32.

At the lower ends of the two booms 32 are carried skids or ground contour shoes 41. These skids or shoes 41 are more particularly illustrated in Figures 8, 9, 10 and 11. The skid is provided with a top plate 42, side plates 55, and a sole plate 43 with suitable internal bracing 41a to maintain strength and good construction. The top plate is provided with a pair of spaced perforated attaching lugs 44 upstanding from the rear portion thereof and forwardly thereof are a pair of spaced perforated lugs 45 for attaching hydraulic valve linkage. At the forward portion of the top plate 42 is a diagonally upturned abutment flange 46 and just rearwardly thereof and projecting upwardly from the plate 42 is a guide lug 47 having a radially elongated slot 48 whose center is the perforation in attaching lugs 44. The elongated slot 48 serves the purpose of limiting the skid travel in relation to the spool 74 travel in the hydraulic valve or shoe operated control means 66.

The sole plate 43 is provided in spaced relation with a downwardly curved heel 49 and a downwardly curved ball 50 at its forward position just rearwardly of a forwardly inclined toe 51.

A pilot blade 56 is centrally, and securely fastened at the forward end of skid 41 with its foremost point 57 and bottom surface 58 being in the same plane with curved ball 54 and heel 49. The top of blade 56 is sharpened or knife-like as shown at 59 in Figures 13 and 14. The upper edge of the pilot blade is sharpened from its foremost point to where it joins the top of the abutment flange 46 of skid 41.

Referring to Figures 8, 9, and 11, each boom 32 has attached to its under forward lower edge, as by welding at 62a, an attaching plate 62 carrying at its rear portion a standard 63 having flanges 64 and also preferably a load transfer fillet or rib 65 welded at 65a beneath the upper portion of the plate 62 and to the upper portion of the standard 63 and flanges 64. The flanges 64 provide a convenient attachment for the skid operated hydraulic valve 66 which may be attached by bolts 87 to the flanges 64 as indicated in Figure 8, or otherwise secured thereto.

As shown in Figure 11, a hole 67 in the lower portion of standard 63 is adapted to receive a pivot pin 68 (Fig. 8) which also passes through the perforations in the upstanding lugs 44 of the skid 41 top plate 42, it being understood that the lower perforated portion of the standard 63 fits between the upstanding perforated lugs 44.

A link 69 having holes 70 and 71 (Fig. 11) is affixed as by a clevis pin 72 (Fig. 8) to the pair of spaced lugs 45 of the skid 41, the lower end of said link 69 being received between the lugs 45. A clevis pin 73 passes through the upper hole 70 of the link 69 and through the perforations provided in the lower slotted or bifurcated end of the spool 74 of the hydraulic valve 66.

At its forward end the plate 62 is provided with a downwardly extending pair of spaced perforated lugs 76 adapted to receive therebetween the front slotted lug 47 on the top plate 42 of the skid 41 and a clevis pin 77 carried by the lugs 76 plays at its intermediate portion up and down in the slot 48.

Figure 3:
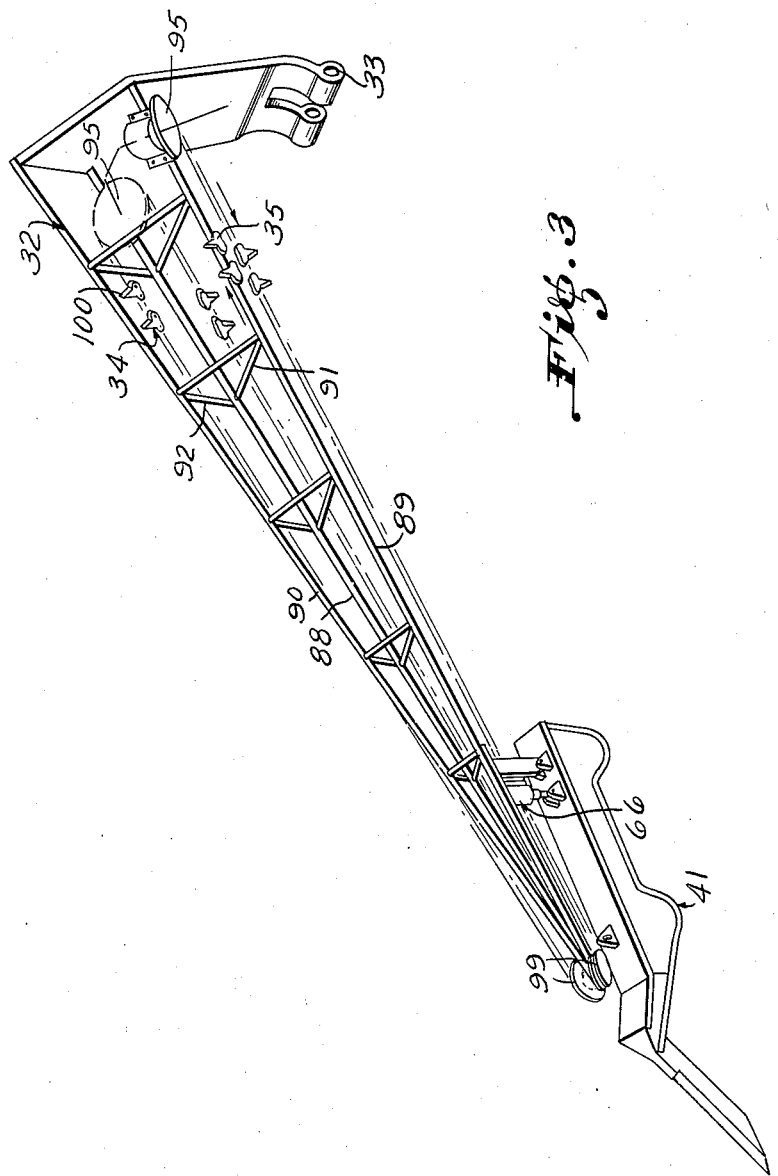
Figure 3 is an isometric view of one of the booms with the pick-up chains and its skid or ground contour shoe.

Referring more particularly to Figures 2, 3 and 4, although it will be understood that the booms 32 may be otherwise constructed, a convenient form of the same is afforded by spaced lower rods 88 and 89 and an upper rod 90 spaced above the lower rods 88 and 89 and arranged substantially centrally of the space therebetween. These rods 88, 89 and 90 form a triangulated structure with all three rods converging toward the lower end of the boom 32. These rods 88, 89 and 90 may be reinforced at spaced intervals by cross frames composed of base bars 91 and side bars 92 and 93 joined together in triangular form and welded or otherwise affixed to one another and to the rods 88, 89 and 90.

Referring more particularly to Figures 1, 3 and 4, each boom 32 may be provided with one or two upper driving sprockets 95 and one or two lower sheaves 99 depending on whether the cane is to be lifted on one side or both sides of the booms 32. The sprockets 95 and sheaves 99 have their upper circumferences slanted outward and the lower circumferences slanted inward (Fig. 4). The upper or sprocket end driving the chains 34 and 35 which have projections 100 spaced apart to receive the cane therebetween.

Referring more particularly to Figure 12, the tank 102 has a strainer 103 at its outlet end which is connected to the suction side of the pump 104, which is preferably of the fixed volume type. Hydraulic fluid is pumped through pilot operated unloading valve 105 from pump outlet, then through check valve 106 into accumulator 107. When the valves 66, 110 and 111 that would normally open the hydraulic circuit are closed, the accumulator 107 receives and stores the hydraulic fluid under predetermined pressure. When the hydraulic pressure reaches the predetermined point, pilot line 113 transfers pressure to unloading valve 105 overcoming spring pressure in unloading valve 105 and causes unloading valve 105 to unload directly to tank 102 through line 200.

The hydraulic supply line 108 connects the accumulator 107 with the skid operated valves 66 and the manual valves 110 and 111.

The actuating means or hydraulic system to cause alternate raising and lowering of the booms in response to the pivotal movement of the shoes or skids and operation of the control means or valves 66 in the form of the invention shown are the pressure lines 66A leading from valves 66 to valves 110, 111 and thence through lines 110A and 111A to the elevating rams or power operated means 37, 38.

The skid operated valves 66, on both left and right booms 32, includes floating spools 74 that are connected by links 69 to the skids 41.

Remote control valves 110 and 111 are connected both to the pressure supply line 108 and to the skid operated valves 66 and thence to the right or left elevating rams 37 as shown.

In operation, the tractor 30 is driven forward (Fig. 1) through the cane field with booms 32 straddling the cane row to be harvested. In Figure 2 the vehicle is moving toward the left, the two booms 32 being moved therewith, pivoted at 33, supported by hydraulic cylinder 37 which is pivoted at 39 and connected to boom 32 by piston rod 38 and connection 40 and carrying at their lower ends the skids 41 which move along the ground.

As shown more particularly in the comparative views, Figures 5, 6 and 7, each skid 41 is free to rotate about the pivot 68 as a center (restricted only by clevis pin 77 through lugs 76 and 47) and to facilitate this movement the rounded or curved heel 49 may be struck on a radius from the pivot pin 68 as a center. This rounded or curved heel 49 will provide a support for the small amount of weight created by the front end of the boom 32 upon the ground and at the same time enable the skid to move freely about the pins 68 as a center. The hydraulic cylinders 37 contribute the majority of support for the booms along with pivot 33. The curved toe portion 50 beneath the forward portion of the skids 41 will slide up or down upon the uneven surface of the ground causing the skid to swing up or down about the center 68 in obedience to ground contour changes. In this movement the front portion of each skid is guided by the movement of the pins 77 in the slots 48 of the mutual guide lugs 47 and 76. Such arrangement will hold the skids 41 in alignment.

Incident to such angular or oscillating movement of the skids 41, the spools 74 of the skid operated valve 66 will be correspondingly moved to control the flow of hydraulic fluid to the right and left elevating rams as later explained.

This up and down swinging movement of the forward portions of the skids 41 will enable the lower pointed ends of the skid blades 56 to probe very close to the ground and to pass beneath recumbent cane, having the effect as the machine moves forward to pry the cane from its fallen or down condition, upwardly due to the inclination of the blades 56, into position where chains 34 and 35 will continue to straighten the cane to an upright position. Such cane appears at 112 in Figure 1, where the cane is shown in successive positions from a down position to a substantially vertically erect position. This is accomplished as the machine moves forward, the cane being passed from the blades 56 to the upwardly inclined booms 32 and their conveyor chains 34 and 35, due to the inclination of the same the cane 112 will be elevated to an upright position as the machine progresses along the cane row.

The endless chains 34 and 35 are driven from the same source of power as the other mechanism of the harvester and are substantially in time with the forward progress of the machine and the other mechanism of the harvester. The source of power can be the tractor 30, power take-off 30a.

The two booms 32 swing up and down independently and have separate and independent ground contour shoes or skids 41 and independent skid operated hydraulic valves 66. The individual skids 41 ride the contours of the terrain over which the device is being propelled. These skids 41 sense the changes in the contour of the terrain and communicate such changes by a mechanical or other linkage to the entrained skid operated hydraulic valve 66 which in turn opens or closes the pressure side of the hydraulic system 108 to the involved elevating rams 37. In other words the skid operated hydraulic valves 66 permit application or evacuation of hydraulic fluid under pressure to or from the boom elevating rams 37 to either raise or lower the booms 32 as sensed by their respective skids 41.

Figure 5 shows the intermediate position of the skid 41 with the clevis pin 77 in a substantially central position of the guide slot 48. This means that the skid operated hydraulic valve 66 has its spool 74 centered thereby blocking the flow of hydraulic fluid to or from the respective elevating rams 37.

Figure 6 shows the skid 41 in an ascendant position with the clevis pin 77 in the lowest position of the guide slot 48 and the abutment flange 46 abutting the boom 32 as a stop. This feature serves to take the shearing stress off of clevis pin 77 should the booms hit a higher than normal obstruction or should the tractor 30 drop into a hole and require the booms to raise more than the stroke of the elevating rams will permit. The slot in the ram knuckle construction 40 will also facilitate this condition (Fig. 2). It will also be noted that this abutment flange 46, due to its upturned diagonal condition which enables it to function as a stop also enables it to carry the blade 56 in an inclined position which is substantially a prolongation of the inclined boom 32 with which it is associated. This enables the facile transition of the cane from the blade 56 to the boom 32. The fact that the boom not only inclines upwardly and rearwardly but also is inclined on its inner side to form one wall of the throat 36 not only erects the cane but also centers it to a correct position for reception by the harvester in a standing and substantially erect position.

Referring more particularly to Figure 12, the supply of hydraulic fluid originates in tank 102 with strainer 103 in line leading to a fixed volume pump 104, which is driven by available power source.

The pump 104 pumps hydraulic fluid through pilot operated unloading valve 105, through a check valve 106, into accumulator 107 which stores hydraulic fluid under pressure and is connected to hydraulic pressure line 108. When pressure reaches predetermined point, pressure is transferred via pilot line 113 to unloading valve 105 which opens line between pump 104 and check valve 106 and unloads pump capacity directly into tank 102. Thus the pump 104 can circulate hydraulic fluid, under reduced pressure, saving wear on pump, reducing hydraulic fluid heating and using less power, until hydraulic pressure in line 108 and accumulator 107 drop low enough to allow unloading valve 105 to close and recharge the accumulator to predetermined hydraulic pressure.

Valves 110 and 111 are manually operated detent valves. In the position shown, hydraulic fluid is blocked from pressure line 108 and the valves' porting is open between the respective elevating rams 37 and skid operated hydraulic valves 66.

In the position shown this skid operated valve 66 for both the left and right booms are centered and the porting is blocked between pressure line 108 and the line to detent valves 110 and 111. However, if the skid 41 is raised, as shown in Figure 6, hydraulic fluid will pass through the porting in valves 66 through the detent valves 110 and 111 into elevating rams 37, causing the plunger and plunger rods 38 to be driven out and the pick up attachment booms 32 will raise. The upward movement of the booms 32 will continue until the skids 41 drop sufficiently to cause the spools 74 of the skid operated valves 66 to reach a central position where the ports of the skid operated valve 66 are blocked and the booms 32 remain stationary until the next movement of the skids 41.

When the skids 41 lower, as shown in Figure 7, hydraulic fluid flows from elevating rams 37 through manual valves 110 and 111 and through the porting of skid operated valves 66 to tank 102. Booms 32 move downward until the spools 74 in the skid operated valves 66 reach a central position where the ports of the skid operated valve 66 are blocked and the booms 32 remain stationary until the next movement of the skids 41.

In the position of Figure 7 when the skid 41 changes its position from traveling forward and down to forward and level or to forward and up, the forward free ends of the blades 56 are kept close to the ground. The blades are sharp and may cut through a small amount of the earth crust but the bearing area of the toe 50 of the skid 41 is sufficient to float the skid 41 along the normal ground surface so that the point of the blades 56 can get beneath the recumbent cane.

For transportation purposes, turning the harvester around, clearing obstacles, crossing ditches, etc., the manually controlled detent valves 110 and 111 can be moved manually so that their spools are in the forward position. This position blocks the porting between the skid operated valves 66 and the elevating ram 37 and connects the elevating rams 37 directly to the pressure line 108, causing the rams 37 to travel its plungers 38 outward to their fullest extent and causing the booms 32 to raise. Should the tractor drop into a hole whereby the boom would be endangered of hitting the ground, the slots in attachment 40 (Fig. 2) will allow the booms 32 to be elevated even higher than the rams 37 can do.

The foregoing hydraulic circuit has been described as a closed circuit using an accumulator 107 for storing hydraulic fluid under pressure ready for instant use by the valves. The same results can be obtained by using an open circuit, without an accumulator but it would require larger pumps; one pump would be required for each boom 32 and its valves 66—110 and 66—111 and more hydraulic lines and result in higher pressure surges.

In the particular hydraulic system illustrated, an accumulator 107 is used to maintain available hydraulic fluid in sufficient volume and under sufficient pressure to give instantaneous action whenever an automatic valve or manual valve is moved. The simplicity of this hydraulic circuit is exemplified in Figure 12. The use of the proper size accumulator in this circuit will store in reserve a sufficient supply of hydraulic fluid to make it possible to attach other valves and hydraulic cylinders if needed for other work. The use of such an accumulator allows the economy of a much smaller pump than would otherwise be the case since the accumulator has the capacity of storing the the hydraulic fluid to do the work, and a small pump can replenish and recharge the accumulator using less power. Without an accumulator, the pump capacity must be large enough to handle all the hydraulic fluid that might be needed by all the hydraulic cylinders if all were to operate at one time at full speed.

It will be appreciated that the hydraulic circuit as shown in Figure 12 is novel and eliminates much of the linkage and lost motion found heretofore in ground contour controls.

Although we have disclosed herein the best form of the invention known to us at this time, we reserve the right to all such modifications and changes as may come within the scope of the following claims.

What is claimed is:

1. A cane harvester comprising a mobile frame, a forwardly and downwardly inclined elevating and gathering boom pivotally connected adjacent its upper end to said mobile frame, power operated means operatively inter-connected to said mobile frame and to said boom, a ground contour shoe pivotally connected at a rear portion of its top side to the lower portion of said boom, a shoe operated control means operatively connected to said boom and to the top side of said shoe spaced from said pivot, and actuating means operatively connected to said control means and said power operated means to cause alternate raising and lowering of said boom in response to pivotal movement of said ground contour shoe.

2. A device as claimed in claim 1 wherein said ground contour shoe is pivotally connected to the boom at a rear portion of said shoe.

3. A device as claimed in claim 2 further comprising shoe pivoting limit guide means connected between said boom and said shoe forwardly of said pivotal connection between said shoe and boom.

4. A device as claimed in claim 3 wherein said ground contour shoe comprises a heel, ball and toe member and wherein said shoe is pivoted to said boom proximate its heel portion and said shoe pivoting limit guide means is connected to said shoe proximate the ball.

5. A device as claimed in claim 1 wherein said ground contour shoe is an elongated member pivotally connected at its rear end to said boom and wherein said shoe operated control means is connected to said member forwardly of its pivotal connection to said boom.

6. A device as claimed in claim 1 wherein said ground contour shoe comprises a heel, ball and toe.

7. A device as claimed in claim 1 wherein said power operated means is a hydraulic motor in fluid hydraulic circuit with and subject to the control of said shoe operated control means.

8. A device as claimed in claim 1 wherein said ground contour shoe comprises a top plate, a sole plate defining heel, ball and toe portions and being of lesser width than said top plate, and side plates joining said top plate and sole plates together.

9. A device as claimed in claim 1 further comprising shoe pivoting limit guide means comprising a lug secured to the free end of said boom, a pin carried by said lug, a second lug carried by the top plate of said shoe, said second lug having a slot accommodating the pin of said first lug, said second lug carried by said top plate of said shoe forwardly of the heel of said shoe.

10. A device as claimed in claim 1 wherein said shoe operated control means is a sensing valve in circuit with said power operated means and mechanically connected to said shoe to translate and communicate angular positions of said shoe into increase and decrease of power to said power operated means.

11. A cane harvester comprising a mobile frame, a pair of spaced apart side by side forwardly and downwardly inclined elevating and gathering booms pivotally connected adjacent their upper ends to said mobile frame, hydraulic motors connected between said gathering booms and said frame for elevating and lowering said booms, ground contour shoes pivotally connected at their rear ends to the lower portions of said booms, shoe operated control valves connected to the booms and to the shoe of each boom and being in fluid circuit with said hydraulic motors to cause said motors to raise and lower said booms, and actuating means for the shoe operated control valves of each boom connected between said shoes and said control valves whereby upon pivoting of said shoe said actuating means actuates said control valves to operate said hydraulic motors to raise and lower said booms in the direction of pivot of said shoes.

12. A cane harvester as claimed in claim 11 wherein said ground contour shoes have heel, ball and toe portions.

13. A cane harvester as claimed in claim 11 further comprising a blade carried by the forward portion of each ground contour shoe on an inclination to that of the boom.

14. A cane harvester as claimed in claim 11 wherein said shoe operated control valves and actuating means therefor are forwardly of the pivotal connection between the ground contour shoe and boom.

15. A cane harvester as claimed in claim 11 further comprising contour shoe limit stop means connected between each boom and its contour shoe forwardly of said pivotal connection between each contour shoe and its associated boom.

References Cited in the file of this patent

UNITED STATES PATENTS

| | | |
|---|---|---|
| 1,908,966 | Falkiner et al. | May 16, 1933 |
| 2,589,553 | Kesselring | Mar. 18, 1952 |
| 2,610,562 | Ward | Sept. 16, 1952 |
| 2,660,015 | Briscoe | Nov. 24, 1953 |
| 2,700,857 | Stearman | Feb. 1, 1955 |
| 2,750,727 | Wright | June 19, 1956 |